United States Patent
Heuer et al.

(10) Patent No.: US 8,108,539 B2
(45) Date of Patent: Jan. 31, 2012

(54) METHOD FOR SYNCHRONISING SCENE DATA FILES AND MEDIA DATA FLOWS IN AN UNINDIRECTIONAL BROADCAST SYSTEM

(75) Inventors: Jörg Heuer, Oberhaching (DE); Andreas Hutter, München (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 12/312,230

(22) PCT Filed: Oct. 26, 2007

(86) PCT No.: PCT/EP2007/061513
§ 371 (c)(1),
(2), (4) Date: Apr. 30, 2009

(87) PCT Pub. No.: WO2008/052932
PCT Pub. Date: May 8, 2008

(65) Prior Publication Data
US 2010/0049863 A1      Feb. 25, 2010

(30) Foreign Application Priority Data

Oct. 31, 2006   (DE) .......................... 10 2006 051 437
Jun. 8, 2007    (DE) .......................... 10 2007 026 531

(51) Int. Cl.
*G06F 15/16* (2006.01)
(52) U.S. Cl. ..................................................... 709/231
(58) Field of Classification Search .................. 709/231, 709/248
See application file for complete search history.

(56) References Cited

U.S. PATENT DOCUMENTS

| | | | |
|---|---|---|---|
| 6,195,701 B1 * | 2/2001 | Kaiserswerth et al. | 709/231 |
| 6,480,902 B1 * | 11/2002 | Yuang et al. | 709/248 |
| 6,760,749 B1 * | 7/2004 | Dunlap et al. | 709/204 |
| 7,129,408 B2 * | 10/2006 | Uehara | 84/645 |
| 7,143,132 B2 * | 11/2006 | Klein et al. | 709/203 |
| 7,290,057 B2 * | 10/2007 | Saunders et al. | 709/231 |

(Continued)

FOREIGN PATENT DOCUMENTS

JP    2001-359069    12/2001

OTHER PUBLICATIONS

RFC 3926, Request for Comments, T. Paila et al., "FLUTE—File Delivery over Unidirectional Transport", , IETF, Oct. 2004, http://www.rfc-archive.org/getrfc.php?rfc=3926; Others.

(Continued)

*Primary Examiner* — Douglas Blair
(74) *Attorney, Agent, or Firm* — Staas & Halsey LLP

(57) ABSTRACT

A method for the temporal synchronization of data packets of at least one media data flow with scene data files describing at least one scene and/or the data packets of said data files, in a unidirectional broadcast system. The data packets of the media data flow are each provided with a first time mark relating to a first reference time, and the scene data files and/or the data packets thereof are each provided with a second time mark relating to a second reference time. At least one time mark allocation data flow is transmitted from the transmitter to the receiver, the first time marks of the media data flow and the second time marks of the scene data files and/or the data packets thereof being respectively associated with a third time mark relating to a third reference time.

8 Claims, 1 Drawing Sheet

U.S. PATENT DOCUMENTS

| | | | | |
|---|---|---|---|---|
| 7,747,725 | B2* | 6/2010 | Williams et al. | 709/223 |
| 2001/0041061 | A1 | 11/2001 | Nakagawa | |
| 2002/0059583 | A1* | 5/2002 | Kim | 725/32 |
| 2002/0069414 | A1* | 6/2002 | Kim | 725/51 |
| 2005/0038877 | A1* | 2/2005 | Gupta et al. | 709/219 |

OTHER PUBLICATIONS

HisTV Air Interface Draft Version 1.1 (Apr. 25, 2006), www.histv.org; HisTV Air Interface Draft Version 1.1 (Apr. 25, 2006), www.histv.org; HisTV Air Interface Draft Version 1.1 (Apr. 25, 2006), www.histv.org; Book.

RFC 958 Network Working Group, D.L. Mills, Request for Comments: 958, M/A-COM Linkabit, Network Time Protocol (NTP), Sep. 1985; RFC 958 Network Working Group, D.L. Mills, Request for Comments: 958, M/A-COM Linkabit, Network Time Protocol (NTP), Sep. 1985; RFC 958 Network Working Group, D.L. Mills, Request for Comments: 958, M/A-COM Linkabit, Network Time Protocol (NTP), Sep. 1985; Others.

RFC 3550 RTP: A Transport Protocol for Real-Time Applications. H. Schulzrinne, S. Casner, R. Frederick, V. Jacobson. Jul. 2003; RFC 3550 RTP: A Transport Protocol for Real-Time Applications. H. Schulzrinne, S. Casner, R. Frederick, V. Jacobson. Jul. 2003; RFC 3550 RTP: A Transport Protocol for Real-Time Applications. H. Schulzrinne, S. Casner, R. Frederick, V. Jacobson. Jul. 2003; Others.

Diaman J. et al: "Client architecture for MPEG-4 streaming" IEEE Multimedia, IEEE Service Center, New York, NY, US, Bd. 11, Nr. 2, Apr. 1, 2004, Seiten 16-23, XP011111993 ISSN: 1070-986X Box "Real-Time Transport Protocol"; Others.

Kalva H. et al: "Implementing Multiplexing, Streaming, and Server Interaction for MPEG-4" IEEE Transactions on circuits and Systems for Video Technology, IEEE Service Center, Piscataway, NJ, US, Bd. 9, Nr. 8, Dec. 1, 1999, Seiten 1299-1312, XP011014637 ISSN: 1051-8215, Sections II and III; Others.

Carsten Herpel: "Elementary Stream Management in MPEG-4" IEEE Transactions on Circuits and Systems for Video Technology, IEEE Service Center, Piscataway, NJ, US Bd. 9, Nr. 2, Mar. 1, 1999, XP011014552 ISSN: 1051-8215 Section III Synchronization of Elementary Streams; Others.

Carsten Herpel (Thomson) et al: "How to signal timing for a FlexMux Stream" Video Standards and Drafts, XX, XX, Nr. M4883, Jul. 6, 1999, XP030034103 Section "Separate FleMux clock reference stream"; Others.

International Standards Organization: "ISO/IEO International Standard 14496-1, Information technology—Coding or audio-visual objects—Part 1: Systems" ISO/IEC 14496-1:1999, XX, XX, Dec. 15, 1999, Seiten 192-203, XP002207352 Section 10.2.5 Clock Reference Stream; Others.

International Standard ISO 14496-20, "Information technology—Coding of audio-visual objects—Part 20: Lightweight Application Scene Representation (LASeR) and Simple Aggregation Format (SAF)," ISO/IEC, Jun. 15, 2006, 150 pages.

Wikipedia, "Real-Time Transport Protocol," http://en.wikipedia.org/wiki/Real-time_transport_protocol, English language, downloaded Jun. 6, 2011, 6 pages; http://de.wikipedia.org/wiki/Real-Time_Transport_Protocol, German language, downloaded Jun. 8, 2007, 4 pages.

International Standard ISO/IEC 13818-6, "Information technology—Generic coding of moving pictures and associated audio information—Part 6: Extensions for DSM-CC," ISO/IEC, Sep. 1, 1998, 31 pages.

\* cited by examiner

METHOD FOR SYNCHRONISING SCENE DATA FILES AND MEDIA DATA FLOWS IN AN UNINDIRECTIONAL BROADCAST SYSTEM

CROSS REFERENCE TO RELATED APPLICATIONS

This application is based on and hereby claims priority to PCT Application No. PCT/EP2007/061513 filed on Oct. 26, 2007, German Application No. 10 2006 051 437.8 filed on Oct. 31, 2006 and German Application No. 10 2007 026 531.1 filed on Jun. 8, 2007 the contents of which are hereby incorporated by reference.

BACKGROUND OF THE INVENTION

In unidirectional broadcast systems data is transmitted from a sender to one or more recipients using the push method. In broadcast systems data is transmitted especially in the streaming method as continuous data streams, which has the advantage of enabling high demands on the accuracy of the data rate to be fulfilled, if for example the data rate is coupled to the system clock of the recipient. Thus audio and video streams are nowadays generally streamed to the recipient, with the data being provided in each case with time marks which specify the point in time at which it is relevant for presentation and/or decoding. The disadvantage of the streaming method is that missing or incorrectly received data cannot be transmitted to the recipient again.

Also known in broadcast systems is data transmission by the download method, in which data is transmitted from the sender to the recipient in the form of data files or data objects and is stored in the recipient. Currently only additional data which relates to an audio and video stream of a same data transmission session, such as electronic program information (EPG=Electronic Program Guide) and the like is transmitted to the recipients using the download method. The reason for this lies in the fact that this type of additional data is not time-critical, so that it is not necessary to synchronize this additional data for a presentation with the audio and video streams transmitted in the streaming method.

This situation has changed fundamentally however in the area of so-called rich media applications, in which graphical scenes are described. Each graphical scene, which can be valid for a longer period, is made up in such applications from audio, video and scene data (graphics and text data) (see for example MPEG-Standard "LASeR" (Lightweight Application Scene Representation), previously known as MPEG-4: Part 20, or ISO/IEC 14496-20, in which a format for description of graphical scenes is specified). Since the status of a scene described by the scene data is time-critical, it is necessary to synchronize the scene data with the audio and video streams.

If the data is transmitted between sender and recipient via point-to-point-connections, the scene data and the media data (audio and video data) can be streamed in parallel to the recipients so that they are available to the recipient at the beginning of the period of time in which they are valid.

A temporal synchronization of the states of a scene with the media streams is enabled by protection mechanisms of the stream synchronization, based on RTP (Real Time Transport Protocol) for example, a protocol for continuous transmission of audio-visual data (streams) over IP-based networks, which is standardized in RFC 3550 (RFC=Request for Comments). In RTP so-called Sender Reports are sent in parallel to the individual media streams, the RTP time marks in the media streams are assigned to NTP time marks (NTP=Network Time Protocol), with the NTP-time marks being unique in all Sender Reports of the different media streams. NTP involves a standard for synchronization of clocks in computer systems over packet-based communication networks which is standardized as RFC 958. The time mark format of NTP is used in the Sender Reports.

Since however it cannot be ensured in the broadcast method that a recipient is already receiving the stream at the beginning of the period of time in which a respective scene is valid, it is necessary, at least during the period of time in which a scene is valid, to keep transmitting the scene data so that a recipient who only connects later can also receive the scene data. A synchronization of scene states based on a synchronization of streams is however not possible in this case. Furthermore advance reception of scene data, which is either complex and thus to be processed at an early stage or may need to be used in other scenes, is not possible.

One approach to solving these problems is by an application referred to as "HisTV", in which a synchronization of scene states is implemented by NTP time marks of the audio or video stream being referenced in the description of the states of a scene. The disadvantage in this case is that it must be known in advance which time marks will be used in the media flows, which is not possible however, especially with live recorded programs. But also with already recorded broadcasts this restricts management of the content at the head end, for example during switching of promotional entries.

SUMMARY

One possible object is to make available a method for synchronizing scene data files describing a scene with media streams (audio/video streams) of the scene.

The inventor's propose a method to synchronize a plurality of data packets of at least one media stream with a plurality of scene data files and/or data packets contained therein describing a scene in a unidirectional broadcast system is disclosed. The at least one media stream is transmitted continuously by a sender of the unidirectional broadcast system to at least one recipient of the unidirectional broadcast system in the streaming method. The unidirectional broadcast system can involve a broadcast, multicast or unicast data transmission system.

The scene data files or their data packets are transmitted from the sender by a data carousel to the at least one recipient in the download method. The data carousel for transmission of the scene data files is suitable for transmitting in repeated cycles to the at least one recipient the scene data files in which in each case at least one scene data object describing a same scene is contained. The data carousel is embodied in the form of a so-called data object carousel and as a result is able to transmit not only files, but also directory structures in a cyclic manner.

Data or data object carousels for sending data in repeated cycles are specified as such for example in the standard DSM CC (DSM-CC=Data Storage Media Command and Control) and thus are well known to the relevant persons skilled in the art, so that a further explanation is not necessary here. Data carousels can also be based on Flute and/or ALC (Asynchronous Layer Coding) and/or LCT (Layer Coding Transport).

The data packets of the at least one media stream are each provided with a first time mark related to a first reference time. The data packets of the scene data files and/or their data packets are each provided with a second time mark, which are related to a second reference time (different from the first reference time).

In the proposed method at least one time mark allocation data stream is also transmitted in the streaming method from the sender to the recipient, in which the first time marks of the data packets of the at least one media stream and the second time marks of the scene data files and/or of their data packets are each assigned a third time mark which are related to a third reference time, so that an assignment of the first time marks to the second time marks is enabled via the third time marks of the time mark allocation data stream.

The proposed method thus advantageously enables a synchronization between previously loaded scenes and streamed media data to be undertaken flexibly in real time. In addition the linking-in of additional content, such as blocks of advertising for example, is possible through the assignment of time marks. The synchronization can be performed as previously in the case of streaming.

If the scene data files with are provided with second time marks, a synchronization of the scene data files with the data packets of the at least one media stream (synchronization at data file level) is undertaken. If the data packets of the scene data files are provided with second time marks, the data packets of the scene data files are synchronized with the data packets of the at least one media stream (synchronization at data packet level). If the data packets of a same scene data file are provided with a same second time mark, the scene data files and the data packets of the scene data files are synchronized with the data packets of the at least one media stream (synchronization at data file level and data packet-level).

In an advantageous embodiment of the method a separate time mark allocation data stream is provided for each media stream which makes a simple implementation possible.

In a further advantageous embodiment of the method the data packets of the at least one time mark allocation data stream are only generated and transmitted if the data packets of the at least one media stream assigned via the third time marks of the third reference time to the data packets of the time mark allocation data stream are transmitted. This offers the advantage of a flexible embodiment of stream transmission, with bandwidth fluctuations especially being taken into account and further content able to be included.

The inventors also propose a unidirectional broadcast system with a sender and at least one recipient, with sender and recipient being suitably embodied for executing a method as described above.

In addition the inventors propose a sender of the unidirectional broadcast system described above in which a machine-readable program code is executed or is able to be executed, containing control commands which cause the sender to carry out a method as described above. In addition the inventors propose machine-readable program code (computer program) for such a sender, which contains control commands which cause the sender to execute a method as described above. In addition the inventors propose a memory medium (computer program product) with such a machine-readable program code stored thereon.

The inventors further propose a recipient of a unidirectional broadcast system as described above, in which machine-readable program code is executed or is able to be executed, which contains control commands which cause the recipient to execute a method as described above. In addition the inventors propose machine-readable program code (computer program) for such a recipient, which contains control commands which cause the sender to execute a method as described above. In addition the inventors propose a memory medium (computer program product) with such a machine-readable program code stored thereon.

BRIEF DESCRIPTION OF THE DRAWINGS

These and other objects and advantages of the present invention will become more apparent and more readily appreciated from the following description of the preferred embodiments, taken in conjunction with the accompanying drawing of which.

DETAILED DESCRIPTION OF THE PREFERRED EMBODIMENT

Figure 1:
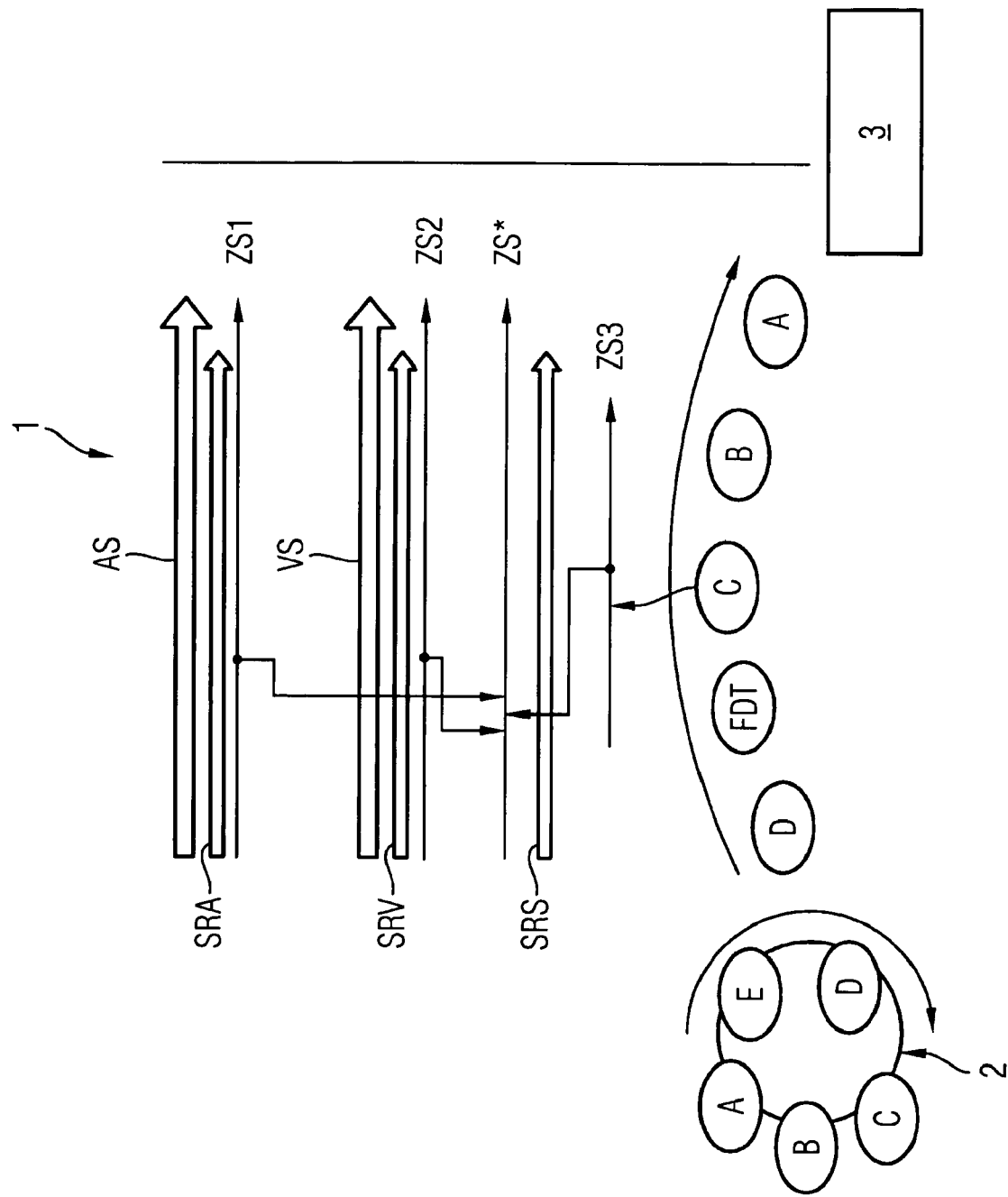
FIG. 1 shows an exemplary embodiment of a proposed unidirectional broadcast system to illustrate an exemplary embodiment of the proposed method.

Reference will now be made in detail to the preferred embodiments of the present invention, examples of which are illustrated in the accompanying drawing, wherein like reference numerals refer to like elements throughout.

FIG. 1 shows an exemplary embodiment of the unidirectional broadcast system identified by the reference symbol 1. The data transmission system comprises a sender 2 (data carousel server) and a plurality of recipients 3, of which only one is shown in FIG. 1. The data is sent between sender 2 and recipient 3 using the broadcast method, meaning that the push method is used for sending from the sender 2 to the recipient 3. Data can be transmitted wirelessly or over wires, but this is not shown in any greater detail in FIG. 1.

In the data carousel or data object carousel of the sender 2, which can especially be specified in accordance with the standard format DSM-CC, or can be based on Flute and/or ALC (Asynchronous Layer Coding) and/or LCT (Layer Coding Transport) are a plurality of scene data files A-E, each containing one or more scene data objects for description of at least one same graphical scene and are transmitted in repeated cycles to the recipient 3.

In FIG. 1 the different scene data files A-E are distributed for the purposes of clearer presentation around the circumference of a ring, with the arrow symbolizing the direction of rotation of the data carousel and the arrangement of the scene data files A-E on the data carousel, specifying the temporal sequence for cyclic sending out of the scene data files A-E. This means that the second scene data file B is sent out after the first scene data file A, the third scene data file C after the second scene data file B, the fourth scene data file D after the third scene data file C and the fifth scene data file E after the fourth scene data file D. Then the sending out of the first to fifth scene data files A-E in this order is repeated for a selectable period of time, which is valid for a presentation and/or decoding and/or storage of the scene described in the scene data objects of the scene data files A-E.

It is known that, especially when FEC protection mechanisms (FEC=Forward Error Correction) are used, this is an idealized representation and that the sequence of the scene data files A-E can only be interpreted by the recipient.

The transmission of scene data files A-E involves a Flute transmission session in accordance with the RFC 3926 "Flute" (Flute=File Delivery over Unidirectional Transport) protocol standardized by the IETF (Internet Engineering Task Force). In this case, in addition to the scene data files A-E, an index file FDT (FDT=File Delivery Table) is transmitted.

The scene data files A-E and/or their data packets are each provided with a scene data file time mark which are related to a scene data file reference time (time scale) ZS3.

The sender 2 continues to transmit an audio stream AS and a video stream VS to the recipient 3 using the streaming method.

The data packets of the audio stream AS are each provided with an audio stream time mark, which is related to an audio stream reference time (time scale) ZS1. This involves RTP time marks based on RTP (Real Time Transport Protocol) which is standardized in RFC 3550 (RFC=Request for Comments).

The data packets of the video stream VS are each provided with a video stream time mark which are related to a video stream reference time (time scale) ZS2. This involves RTP time marks based on RTP (Real Time Transport Protocol) which is standardized in RFC 3550 (RFC=Request for Comments).

The audio stream reference time ZS1 differs from the video stream reference time ZS2. The audio reference time ZS1 and the video stream reference time ZS2 are each different from the scene data file reference time ZS3.

In addition three time mark allocation data streams are transmitted in the streaming method from the transmitter 2 to the recipient 3, namely a first time mark allocation data stream SRA, which is assigned to the audio stream AS, a second time mark allocation data stream SRV, which is assigned to the video stream VS and a third time mark allocation data stream SRS, which is assigned to the scene data file.

In the first time mark allocation data stream SRA, which is assigned to the audio stream AS, for each audio stream time mark of the data packets of the audio stream AS, an assignment is undertaken to a reference time (time mark) of a common reference time (time scale) ZS*. In this case Sender Reports are sent which assign NTP time marks to the RTP time marks in the audio stream AS. The NTP time marks are based on NTP (NTP=Network Time Protocol), which is standardized as RFC 958.

In the second time mark allocation data stream SRV, which is assigned to the video stream VS, for each video stream time mark of the data packet of the video stream VS an assignment is undertaken to the reference time time mark of the common reference time (time scale) ZS*. In this case Sender Reports are sent which assign NTP time marks to the RTP time marks in the video stream VS.

In the third time mark assignment stream SRS, which is assigned to the scene data files A-E, for each scene data file time mark of the scene data files A-E and/or their data packets, an assignment to the reference time time mark of the common reference scale (time scale) ZS* is undertaken. In this case Sender Reports are sent which assign the scene data file time marks of the scene data files A-E and/or of their data packets to NTP time marks.

Thus the first time mark allocation data stream SRA assigns the RTP time marks to NTP time marks, the second time mark allocation data stream SRV assigns the RTP time marks to the NTP time mark and the third time mark allocation data stream SRS assigns the time mark of the scene data files and/or their data packets to NTP time marks.

The NTP time marks of the first, second and third time mark allocation data streams SRA, SRV, SRS each relate to the same time scale ZS*. The time scale ZS* can be interpreted on the receive side in respect of a clock or clock generation unit.

Through the first, second and third time mark allocation data stream SRA, SRV, SRS the recipient 3 can use the common reference time ZS* to execute a unique assignment of the scene data files A-E and/or their data packets to the data packets of the video streams and audio streams VS, AS and in this way temporally synchronize the scene data files with the video streams and audio streams for a presentation and/or decoding and/or storage.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for temporal synchronization comprising:
transmitting media data packets from a sender to a recipient by broadcasting via a parallel streaming of a plurality of media streams, the media data packets containing a first portion of a user presentation;
transmitting scene data files in scene data packets, the scene data files describing a scene, the scene data packets being transmitted from the sender to the recipient outside of the media streams parallel streaming, the scene data files containing a second portion of the user presentation, such that the user is simultaneously presented with both the media from the media data packets and the scene;
prior to transmission of the at least one broadcast media streams, providing each media data packet with a first time mark related to a first reference time;
prior to transmission of the scene data packets, providing each scene data file and/or each scene data packet with a second time mark related to a second reference time;
generating a plurality of time mark allocation data streams, each containing third time marks, each third time mark relating to a third reference time, each third time mark being assigned to first and second time marks to allocate the first and second time marks to one another; and
transmitting a separate the time mark allocation data stream from the sender to the recipient for each media stream.

2. The method as claimed in claim 1, wherein
the time mark allocation data stream is a stream of data packets,
the data packets of the time mark allocation data stream is only generated and transmitted if the media data packets of the media stream are transmitted.

3. The method as claimed in claim 1, wherein the scene data files are transmitted from a data carousel.

4. A sender of a unidirectional broadcast system, comprising:
a transmitter to:
transmit media data packets to the recipient by broadcasting via a parallel streaming of a plurality of media streams, the media data packets containing a first portion of a user presentation; and
transmit scene data files in scene data packets, the scene data files describing a scene, the scene data packets being transmitted to the recipient outside of the media streams parallel streaming, the scene data files containing a second portion of the user presentation, such that the user is simultaneously presented with both the media from the media data packets and the scene;
a time stamp device to:
prior to transmission of the at least one broadcast media streams, provide each media data packet with a first time mark related to a first reference time;

prior to transmission of the scene data packets, provide each scene data file and/or each scene data packet with a second time mark related to a second reference time; and an allocation computer to:
generate a plurality of time mark allocation data streams, each containing third time marks, each third time mark relating to a third reference time, each third time mark being assigned to first and second time marks to allocate the first and second time marks to one another; and
transmit a separate the time mark allocation data stream from the sender to the recipient for each media stream.

5. A unidirectional broadcast system comprising:
a sender according to claim 4; and
and at least one recipient comprising:
a receiver to receive the media data stream, the scene data packets and the time mark allocation data stream; and
an allocation unit to allocate the first and second time marks to one another using the time mark allocation data stream.

6. A non-transitory computer readable storage medium storing a program for controlling a computer to perform a method for temporal synchronization, the method comprising:
transmitting media data packets from a sender to a recipient by broadcasting via a parallel streaming of a plurality of media streams, the media data packets containing a first portion of a user presentation;
transmitting scene data files in scene data packets, the scene data files describing a scene, the scene data packets being transmitted from the sender to the recipient outside of the media streams parallel streaming, the scene data files containing a second portion of the user presentation, such that the user is simultaneously presented with both the media from the media data packets and the scene;
prior to transmission of the media data packets, providing each media data packet with a first time mark related to a first reference time;
prior to transmission of the scene data packets, providing each scene data file and/or each scene data packet with a second time mark related to a second reference time;
generating a plurality of time mark allocation data streams, each containing third time marks, each third time mark relating to a third reference time, each third time mark being assigned to first and second time marks to allocate the first and second time marks to one another; and
transmitting a separate the time mark allocation data stream from the sender to the recipient for each media stream.

7. The computer readable storage medium as claimed in claim 6, wherein the a data carousel is used to transmit the scene data files.

8. A recipient of a unidirectional broadcast system, comprising:
a first receive unit to receive media data packets from a sender via a broadcast parallel streaming of a plurality of media streams, the media data packets containing a first portion of a user presentation, each media stream containing a first time mark related to a first reference time;
a second receive unit to receive scene data files in scene data packets, the scene data files describing a scene, the scene data packets being transmitted from the sender outside of the media streams parallel streaming, the scene data files containing a second portion of the user presentation;
a third receive unit to receive a separate time mark allocation data stream from the sender for each media stream, the time mark allocation data stream containing third time marks, each third time mark relating to a third reference time, each third time mark being assigned to first and second time marks;
an allocation computer to allocate the first and second time marks to one another based on the third time marks; and
a replay unit to synchronize the media streams with the scene such that the user is simultaneously presented with both the media from the media data packets and the scene.

* * * * *